United States Patent [19]

Boden et al.

[11] Patent Number: 5,015,720

[45] Date of Patent: May 14, 1991

[54] METHOD FOR PREPARING POLYCARBONATES CONTAINING ALIPHATIC ESTER GROUPS

[75] Inventors: Eugene P. Boden, Scotia; Peter D. Phelps, Schenectady, both of N.Y.

[73] Assignee: General Electric Company, Schenectady, N.Y.

[21] Appl. No.: 535,258

[22] Filed: Jun. 8, 1990

[51] Int. Cl.$^5$ .............................................. C08G 63/64
[52] U.S. Cl. .................................... 528/179; 528/176; 528/182
[58] Field of Search .................... 528/179, 182, 176

[56] References Cited

U.S. PATENT DOCUMENTS

| | | | |
|---|---|---|---|
| 3,030,331 | 4/1962 | Goldberg | 260/42 |
| 3,169,121 | 2/1965 | Goldberg | 260/47 |
| 4,130,548 | 12/1978 | Kochanowski | 528/197 |
| 4,238,596 | 12/1980 | Quinn | 528/179 |
| 4,238,597 | 12/1980 | Markezich et al. | 528/179 |
| 4,286,083 | 8/1981 | Kochanowski | 528/173 |

*Primary Examiner*—Harold D. Anderson
*Attorney, Agent, or Firm*—William H. Pittman; James C. Davis, Jr.

[57] ABSTRACT

Polycarbonates containing aliphatic dicarboxylic ester groups, and having glass transition temperatures and processing temperatures lower than the corresponding homopolycarbonates are prepared via an intermediate which is in turn prepared from a dihydroxyaromatic compound and a $C_{4-6}$ aliphatic dicarboxylic acid anhydride, preferably succinic anhydride. Phosgenation of said intermediate produces the desired soft segment polycarbonate.

20 Claims, No Drawings

METHOD FOR PREPARING POLYCARBONATES CONTAINING ALIPHATIC ESTER GROUPS

This invention relates to the preparation of polycarbonates containing ester groups, and more particularly to the preparation of polycarbonates of this type which have relatively low glass transition temperatures.

Polycarbonates such as bisphenol A polycarbonate are tough, clear, highly impact resistant thermoplastic resins with a wide variety of uses. However, they have relatively high melt viscosities and glass transition temperatures, the latter for bisphenol A being on the order of 150°-154° C. Thus, they often do not flow readily under normal processing conditions. As a result, adverse consequences are often encountered, including poor wet-out of fibrous reinforcing media, difficulty of filling intricate mold cavities and the necessity of high mold tempreratures.

Various methods have been developed for improving the flow characteristics of polycarbonates. These include the incorporation of plasticizers therein, the use of chain termination agents in relatively large quantities to produce polycarbonates of low molecular weight and the employment of bisphenols having long aliphatic chains. These measures, however, generally introduce other problems such as embrittlement and a decrease in impact strength.

Copending, commonly owned applications Ser. Nos. 07/476,066 and 07/476,068 describe the preparation of copolyestercarbonates having relatively low glass transition temperatures, by the incorporation in a polycarbonate-forming reaction of a C8-20 aliphatic dicarboxylic acid or a salt thereof.

It would be desirable to form copolyestercarbonates of low glass transition temperature by a method which makes efficient use of phosgene, and which employs relatively inexpensive, lower molecular weight dicarboxylic acids or their derivatives such as succinic acid or succinic anhydride. Various patents suggest that this can be achieved. Reference is made, for example, to U.S. Pat. Nos. 3,030,331, 3,169,121, 4,130,548 and 4,286,083, all of which disclose copolyestercarbonate preparation under interfacial conditions using both low and relatively high molecular weight dicarboxylic acids or salts thereof. Examples of the low molecular weight acids are oxalic, malonic, dimethylmalonic, succinic, glutaric and adipic acids. However, it is often found that these procedures do not make optimum use of such acids, generally incorporating less than about 10% thereof into the polyestercarbonate.

According to U.S. Pat. Nos. 4,238,596 and 4,238,597, copolyestercarbonates of the same type may be prepared by employing diacid chlorides. However, these reagents are much more expensive than the free acids and, in many instances, their dianhydrides. Moreover, the polymers obtained by the use of diacid chlorides are usually highly colored.

The present invention is based on the discovery that a major problem with the incorporation of lower molecular weight aliphatic dicarboxylic acid groups in copolyestercarbonates is the relatively high solubility of the dicarboxylic acids in water, and their consequent tendency to migrate to the relatively non-reactive aqueous phase rather than remaining in the reactive organic phase or at the interface in the interfacial systems normally employed for the preparation of polycarbonates by phosgenation. It has further been discovered that the anhydrides of such acids are much more soluble in organic media and have a much decreased tendency to migrate to the aqueous phase. Therefore, they are more efficiently incorporated in copolyestercarbonates. The resulting polymers have properties similar to those of analogous homopolycarbonates but have substantially lower glass transition temperatures, and consequently can be conveniently processed at lower temperatures.

Accordingly, the invention is a method for preparing an aromatic polycarbonate containing aliphatic dicarboxylic ester groups which comprises the steps of:

(A) preparing an intermediate by the reaction in the absence of phosgene and in an alkaline medium of at least one dihydroxyaromatic compound and at least one anhydride of an aliphatic dicarboxylic acid having 4–6 carbon atoms; and (B) effecting reaction between said intermediate and phosgene, in a mixture comprising an alkaline reagent, water, a substantially water-immiscible organic liquid and an interfacial polycarbonate formation catalyst and at a pH in the range of about 8–14.

The dihydroxyaromatic compounds useful in the method of this invention include those having the formula $$HO-A^1-OH, \qquad (I)$$

wherein $A^1$ is a divalent aromatic radical. Suitable $A^1$ radicals include m-phenylene, p-phenylene, 4,4'-biphenylene, 4,4'-bi(3,5-dimethyl)phenylene, 2,2-bis(4-phenylene)propane and similar radicals such as those which correspond to the dihydroxy compounds disclosed by name or formula (generic or specific) in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, $A_1$ is a hydrocarbon radical.

The $A^1$ radical preferably has the formula $$-A^2-Y-A^3-, \qquad (II)$$

wherein each of $A^2$ and $A^3$ is a monocyclic divalent aromatic radical and Y is a bridging radical in which one or two atoms separate $A^2$ from $A^3$. The free valence bonds in formula II are usually in the meta or para positions of $A^2$ and $A^3$ in relation to Y. Compounds in which $A^1$ has formula II are bisphenols, and for the sake of brevity the term "bisphenol" is sometimes used herein to designate the dihydroxyaromatic compounds; it should be understood that non-bisphenol compounds of this type may also be employed when appropriate.

In formula II, the $A^2$ and $A^3$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula II is the 2,2-bis(4-phenylene)propane radical, which is derived from bisphenol A and in which Y is isopropylidene and $A^2$ and $A^3$ are each p-phenylene.

Also employed in the method of this invention is at least one anhydride of an aliphatic dicarboxylic acid having 4–6 carbon atoms. Such acids include succinic, glutaric and adipic acids. The anhydrides employed may be inner anhydrides, such as the cyclic succinic and glutaric anhydrides, or intermolecular and/or oligomeric anhydrides such as the oligomeric anhydrides of adipic acid. By reason of its availability, relatively low cost and particular suitability, succinic anhydride is usually preferred.

In step A of the method of this invention, the bisphenol and anhydride are caused to react to form an intermediate. This reaction takes place in an alkaline medium. The alkaline reagent is most often an aqueous solution of an alkali or alkaline earth metal hydroxide such as sodium hydroxide, potassium hydroxide or calcium hydroxide, with sodium hydroxide usually being preferred by reason of its availability and relatively low cost. The use of amines and other compounds useful as interfacial polycarbonate formation catalysts (as described hereinafter) is also contemplated, particularly when a homogeneous organic reaction medium is employed.

The alkaline reagent is ordinarily added incrementally, with the concentration thereof not being critical so long as it is present in an amount sufficient to promote the reaction. Typical proportions are about 1–2 equivalents per equivalent of anhydride. (For the purposes of this invention, the equivalent weights of bisphenols and dicarboxylic acid anhydrides are half their molecular weights.)

Any order of introduction of the bisphenol and anhydride may be employed. Particularly in heterogeneous reaction media as described hereinafter, it is frequently advantageous to add the alkaline reagent to a mixture of bisphenol and anhydride. It is also contemplated, however, to initially prepare an alkaline mixture containing the bisphenol and subsequently to add the anhydride.

It is generally preferred for the reaction medium to comprise, in addition to water, a substantially inert, substantially water-insoluble organic liquid. Suitable liquids for this purpose are the ones generally employed in interfacial polycarbonate formation reactions, and their identities will be readily apparent to those skilled in the art. Illustrative liquids are chlorinated aliphatic compounds such as methylene chloride and chloroform, and chlorinated aromatic compounds such as chlorobenzene. Aliphatic compounds are generally preferred, with methylene chloride being most preferred.

While not necessary, the presence of an interfacial polycarbonate formation catalyst of the type described hereinafter with reference to step B is frequently advantageous in step A, at least for the purpose of simplicity in carrying out the method of this invention in its most expeditious form. In some instances the presence of said catalyst may be necessary—for example, when an amine is employed as the alkaline reagent and also as the catalyst.

A chain termination agent may also be incorporated in the reaction mixture of step A. Suitable chain termination agents are those commonly employed for polycarbonate formation, including monohydroxyaromatic compounds such as phenol, p-t-butylphenol and p-cumylphenol. The proportion of chain termination agent is adjusted so as to provide as a final product a polymer having the desired molecular weight; about 1–5 equivalents per 100 equivalents of combined bisphenol and anhydride is typical.

In general, the proportion of anhydride is an amount to provide a final product having the desired properties, including a relatively low glass transition temperature. This is most often about 5–40 mole percent based on total bisphenol and anhydride.

The reaction of step A takes place in the absence of phosgene and is typically conducted at a temperature in the range of about 0°–75° C. most often about 20°–50° C. The product of said reaction is an intermediate which is soluble in the organic phase of the reaction mixture and is capable of facile incorporation as structural units in an interfacially prepared polycarbonate.

It is believed that said intermediate comprises, in addition to bisphenol or its salt, at least one hydroxyaromatic acid or salt thereof which is the reaction product of one mole each of the bisphenol and dianhydride. In the case of bisphenol A and succinic anhydride, said hydroxyaromatic acid will have the formula

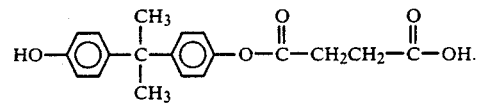

In step B, the above-described intermediate undergoes reaction with phosgene, in the same aqueous-organic alkaline medium employed in step A. The conditions for step B include a pH in the range of about 8–14, most often provided by the addition as necessary of further aqueous base, and the presence of an interfacial polycarbonate formation catalyst.

Suitable catalysts of this type include the tertiary amines disclosed in the aforementioned U.S. Pat. Nos. 4,217,438 and in 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. For the most part, such amines contain at least about 6 and preferably about 6–14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost and effectiveness. Also useful are quaternary ammonium and phosphonium salts and amidines of the type known in the art to be effective in the reaction of phosgene with bisphenols. The proportion of catalyst is most often about 1–5% by weight based on the total of bisphenol and anhydride employed in step A.

desired soft segment polycarbonates, having the properties listed in the following table.

|  | Example | | | | | | |
|---|---|---|---|---|---|---|---|
|  | 1 | 2 | 3 | 4 | 5 | 6 | 7 |
| Anhydride identity & mole %*: | | | | | | | |
| Succinic | 10 | 15 | 20 | 25 | — | — | — |
| Glutaric | — | — | — | — | 15 | 20 | 25 |
| Anhydride incorporated, %** | 93.7 | 90.0 | 87.0 | 89.0 | 87.1 | 88.4 | 84.3 |
| Tg, °C | 145.7 | 140.4 | 138.3 | 133.1 | 137.0 | 133.1 | 120.5 |
| Mol. wt.***: | | | | | | | |
| Wt. avg. | 31,700 | 30,700 | 29,500 | 26,900 | 30,600 | 28,800 | 17,200 |
| No. avg. | 7,900 | 9,100 | 8,700 | 8,300 | 9,300 | 8,300 | 4,800 |

*Based on bisphenol-anhydride mixture.
**As determined by proton nuclear magnetic resonance.
***As determined by gel permeation chromatography relative to polystyrene, corrected for polycarbonate.

Reaction temperatures for step B are generally in the same range as for step A. If desired, chain termination agent may be present; this is particularly true if no such agent was present during step A.

The method of this invention is more economical with respect to usage of phosgene than the methods of the prior art. Moreover, the solubility of the intermediate in the organic phase promotes incorporation of the soft segments in the polycarbonate in proportions approaching stoichiometric.

The soft segment polycarbonate may be isolated from the reaction mixture of step B by conventional separation operations. These may include separation of the aqueous and organic layers and precipitation of the polycarbonate from the organic layer by combination with an anti-solvent such as methanol.

In general, the soft segment polycarbonates prepared by the method of this invention have properties similar to those of conventional aromatic polycarbonates. The major exception is their glass transition temperatures and accordingly their processing temperatures, which are frequently substantially lower.

The preparation of soft segment polycarbonates according to the method of this invention is illustrated by the following examples.

EXAMPLE 1-7

A 500-ml. five-necked Morton flask was fitted with a mechanical stirrer, condenser, pH electrode, addition port for aqueous alkali and phosgene dip tube. The flask was charged with 100 mmol. of various mixtures of bisphenol A and succinic or glutaric anhydride, 200 ml. of methylene chloride, 278 microliters (2 mmol.) of triethylamine and 637 mg. (3 mmol.) of p-cumylphenyl. The mixture was stirred at room temperature as 1 N aqueous sodium hydroxide solution was added over 2-3 minutes in an amount to provide 1.5 equivalents per equivalent of anhydride.

Water was added to provide 50 ml. of aqueous phase, and phosgene was passed into the mixture at the rate of 1 gram per minute for 5 minutes while the pH was maintained at 8.0. The pH was then increased to 10.5-11 by the introduction of additional base, and phosgene addition was continued for 7 minutes.

The aqueous and organic layers were separated and the organic layer was washed with dilute aqueous hydrochloric acid and deionized water. It was then added to 600 ml. of methanol in a blender and the polymer which precipitated was washed with methanol and water and dried in vacuum. The products were the For the sake of comparison, a bisphenol A homopolycarbonate having weight and number average molecular weights of 34,400 and 10,500, respectively, had a glass transition temperature of 154° C.

What is claimed is:

1. A method for preparing an aromatic polycarbonate containing aliphatic dicarboxylic ester groups which comprises the steps of:
   (A) preparing an intermediate by the reaction in the absence of phosgene and in an alkaline medium of at least one dihydroxyaromatic compound and at least one anhydride of an aliphatic dicarboxylic acid having 4-6 carbon atoms; and
   (B) effecting reaction between said intermediate and phosgene, in a mixture comprising an alkaline reagent, water, a substantially water-immiscible organic liquid and an interfacial polycarbonate formation catalyst and at a pH in the range of about 8-14.

2. A method according to claim 1 wherein the dihydroxyaromatic compound is a bisphenol of the formula HO—$A^2$—Y—$A^3$—OH, wherein each of $A^2$ and $A^3$ is a monocyclic divalent aromatic radical and Y is a bridging radical in which one or two atoms separate $A^2$ from $A^3$.

3. A method according to claim 2 wherein said organic liquid is also present in step A.

4. A method according to claim 3 wherein the organic liquid is methylene chloride.

5. A method according to claim 4 wherein said interfacial polycarbonate formation catalyst is also present in step A.

6. A method according to claim 5 wherein the anhydride is succinic anhydride or glutaric anhydride.

7. A method according to claim 6 wherein the alkaline medium in step A is provided by incremental addition of an alkali metal or alkaline earth metal hydroxide.

8. A method according to claim 7 wherein the interfacial polycarbonate formation catalyst is a trialkylamine containing no branching on the carbon atoms in the 1- and 2-positions.

9. A method according to claim 8 wherein the proportion of anhydride is about 5-40 mole percent based on total dihydroxyaromatic compound and anhydride.

10. A method according to claim 9 wherein the mixture of step A also contains a chain termination agent.

11. A method according to claim 10 wherein the alkali metal or alkaline earth metal hydroxide is present in the amount of about 1-2 equivalents per equivalent of anhydride.

12. A method according to claim 10 wherein the proportion of catalyst is about 1-5% based on the total of dihydroxyaromatic compound and anhydride.

13. A method according to claim 8 wherein steps A and B are conducted at a temperature in the range of about 20-50° C.

14. A method according to claim 13 wherein the bisphenol is bisphenol A.

15. A method according to claim 14 wherein the trialkylamine is triethylamine.

16. A method according to claim 15 wherein the anhydride is succinic anhydride.

17. A method for preparing an aromatic polycarbonate containing aliphatic dicarboxylic ester groups which comprises the steps of:

(A) effecting reaction at a temperature in the range of about 0°-75° C., and in the absence of phosgene, between a bisphenol of the formula HO—$A^2$—Y—$A^3$—OH, wherein each of $A^2$ and $A^3$ is a monocyclic divalent aromatic radical and Y is a bridging radical in which one or two atoms separate $A^2$ from $A^3$, and succinic or glutaric anhydride in a mixture of water and a substantially water-immiscible organic liquid, in the presence of a trialkylamine as an interfacial polycarbonate formation catalyst and with the incremental addition of an alkaline reagent; and (B) effecting reaction between the product of step A and phosgene, in the same medium and at a pH in the range of about 8-12.

18. A method according to claim 17 wherein the bisphenol is bisphenol A.

19. A method according to claim 18 wherein the anhydride is succinic anhydride and the proportion thereof is about 5-40 mole percent based on total bisphenol and succinic anhydride.

20. A method according to claim 19 wherein the trialkylamine is triethylamine, the organic liquid is methylene chloride and the alkaline reagent is sodium hydroxide.

* * * * *